(12) United States Patent
Saldana et al.

(10) Patent No.: US 8,387,888 B2
(45) Date of Patent: Mar. 5, 2013

(54) REDUCED-INK BARCODES

(75) Inventors: Daniel M. Saldana, Carmichael, CA (US); Marc Jeffrey Fagan, Folsom, CA (US)

(73) Assignee: DST Output West, LLC., El Dorado Hills, CA (US)

( * ) Notice: Subject to any disclaimer, the term of this patent is extended or adjusted under 35 U.S.C. 154(b) by 176 days.

(21) Appl. No.: 12/652,622

(22) Filed: Jan. 5, 2010

(65) Prior Publication Data
US 2011/0163169 A1    Jul. 7, 2011

(51) Int. Cl.
*G06K 19/05*    (2006.01)

(52) U.S. Cl. .................................. 235/494; 235/462.25

(58) Field of Classification Search .................. 235/494, 235/454, 462.01, 462.25
See application file for complete search history.

(56) References Cited

U.S. PATENT DOCUMENTS

| | | | |
|---|---|---|---|
| 6,267,296 B1 * | 7/2001 | Ooshima et al. | 235/487 |
| 6,273,340 B1 * | 8/2001 | Rivailler | 235/494 |
| 7,017,806 B2 * | 3/2006 | Peterson | 235/384 |
| 7,156,308 B2 * | 1/2007 | Lubow | 235/462.01 |

* cited by examiner

*Primary Examiner* — Daniel St. Cyr
(74) *Attorney, Agent, or Firm* — James M. Ritchey (57) ABSTRACT

A reduced-ink barcode is disclosed in which the barcode has printed dot foreground and non-printed background element regions assembled into a detectable pattern on a document and is printed with each of the printed dot foreground element regions having less than a maximum printed dot density.

5 Claims, 9 Drawing Sheets

FIGURE 1

(PRIOR ART)

FIGURE 2

(PRIOR ART)

FIGURE 3

(PRIOR ART)

Approximately 4X Size Reduced Fill 2D Datamatrix Barcode

Original Size Reduced Fill 2D Datamatrix Barcode

Approximately 4X Size Normal 2D Datamatrix Barcode

Original Size Normal 2D Datamatrix Barcode

FIGURE 6

REDUCED-INK BARCODES

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

The subject invention pertains generally to minimizing the amount of ink utilized to generate a barcode, yet increasing the readability of the reduced-ink barcode by using a truly "more-for-less" ink application technique.

2. Description of Related Art

Figure 1:
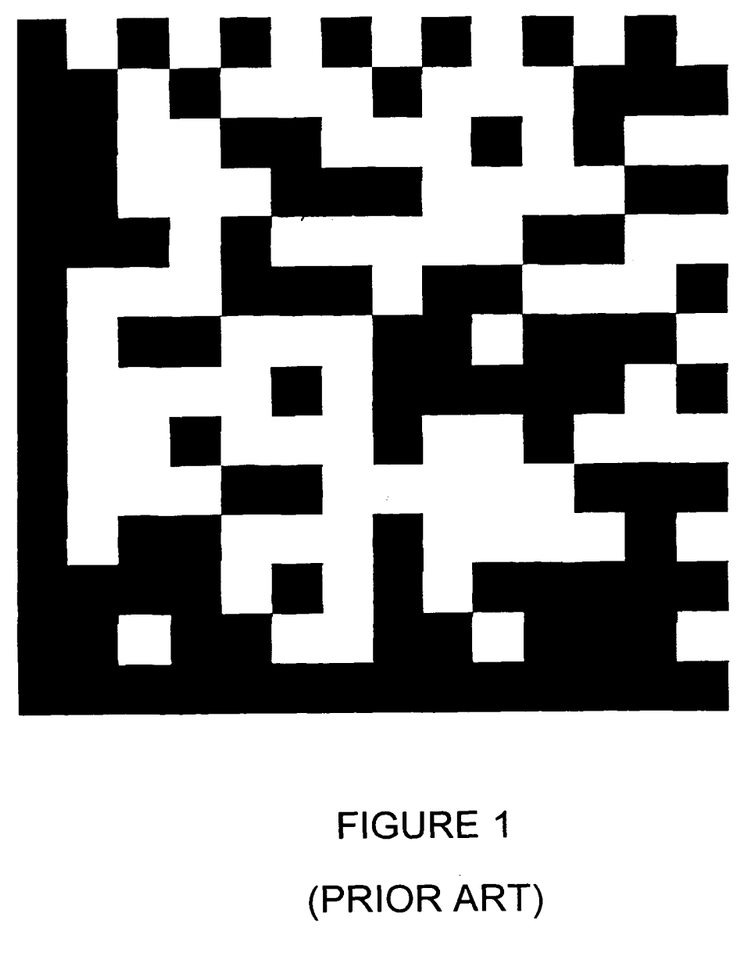
FIG. 1 is a PRIOR ART representation of an "idealized" traditionally printed datamatrix (2-D) barcode.

In the conventional printing of barcodes, in general, and datamatrix (2-D) barcodes, in particular, the area comprising such a barcode contains a combination of elemental regions, where each such elemental region is completely filled by either the foreground or background color (e.g., black foreground and white background). The dimension of a barcode's elemental regions is commonly referred to as the "x-dimension" and is commonly expressed in thousandths of an inch, also known as "mils". For example, a datamatrix barcode with an x-dimension of 0.02 inches is referred to as a 20-mil barcode. FIG. 1 (PRIOR ART) illustrates an ideal printed result for this existing technique.

Figure 2:
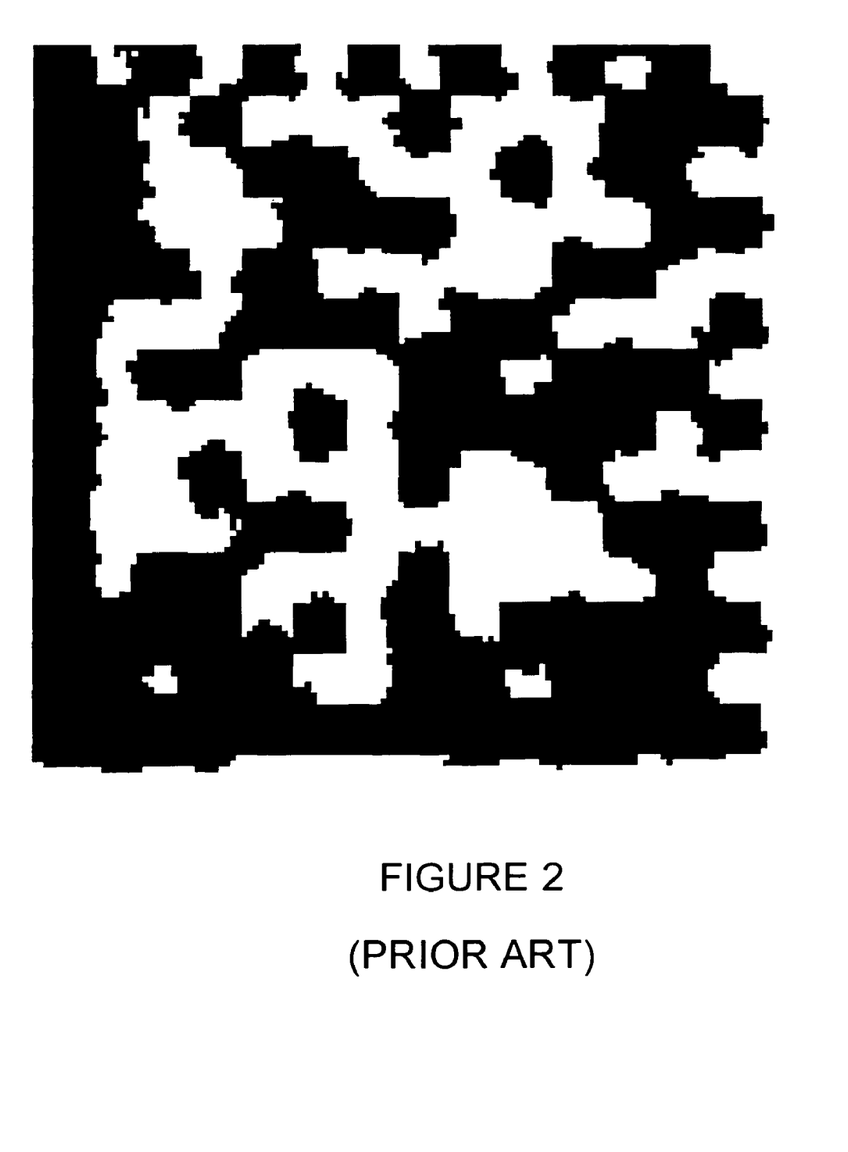
FIG. 2 is a PRIOR ART representation of a "real-life" traditionally printed datamatrix (2-D) barcode showing the resulting ink splatter and the resultant confused blending of dark and light regions.

Printed output from many industrial ink-jet printers is frequently prone to a "splatter" effect in which stray drops of ink are present in non-print areas that border the intended print. Such ink splatter produces barcodes in which foreground elements encroach upon neighboring background elements. While the datamatrix format is very robust, a significant amount of ink splatter can considerably degrade readability of a barcode when the barcode being printed is small in size. Under such conditions, the distinction between some foreground and background elements is lost or diminished, as shown in FIG. 2 (PRIOR ART).

Figure 3:
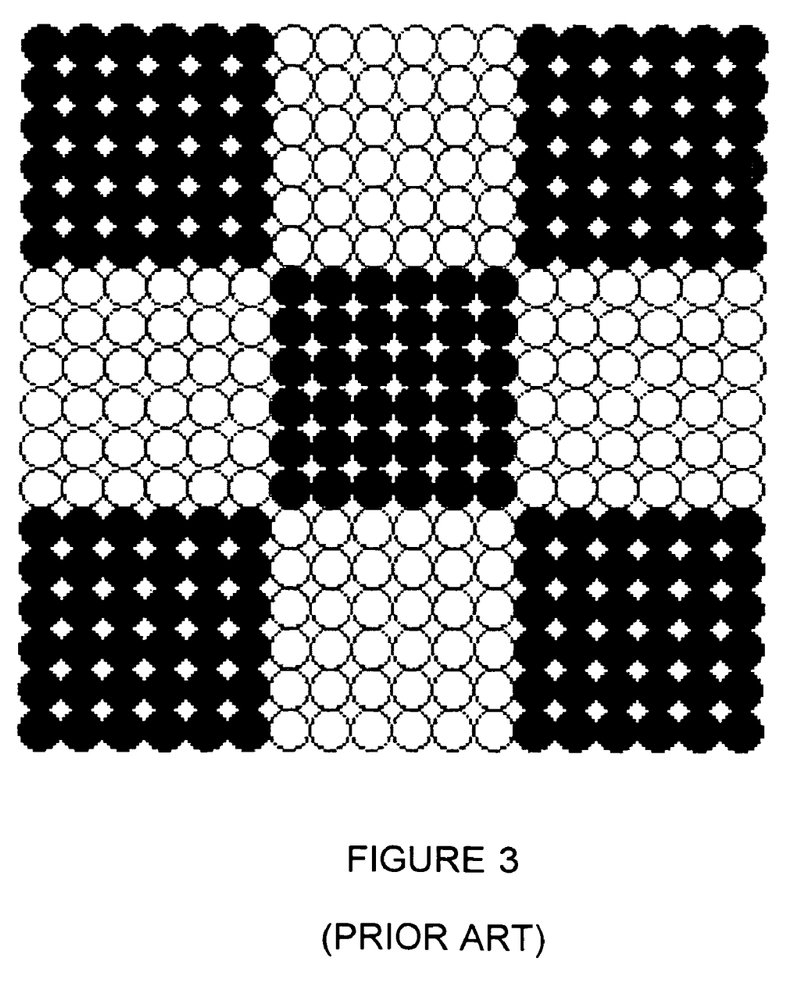
FIG. 3 is a PRIOR ART show an "idealized" close-up representation of nine region elements within a conventionally printed datamatrix barcode.
Figure 4A:
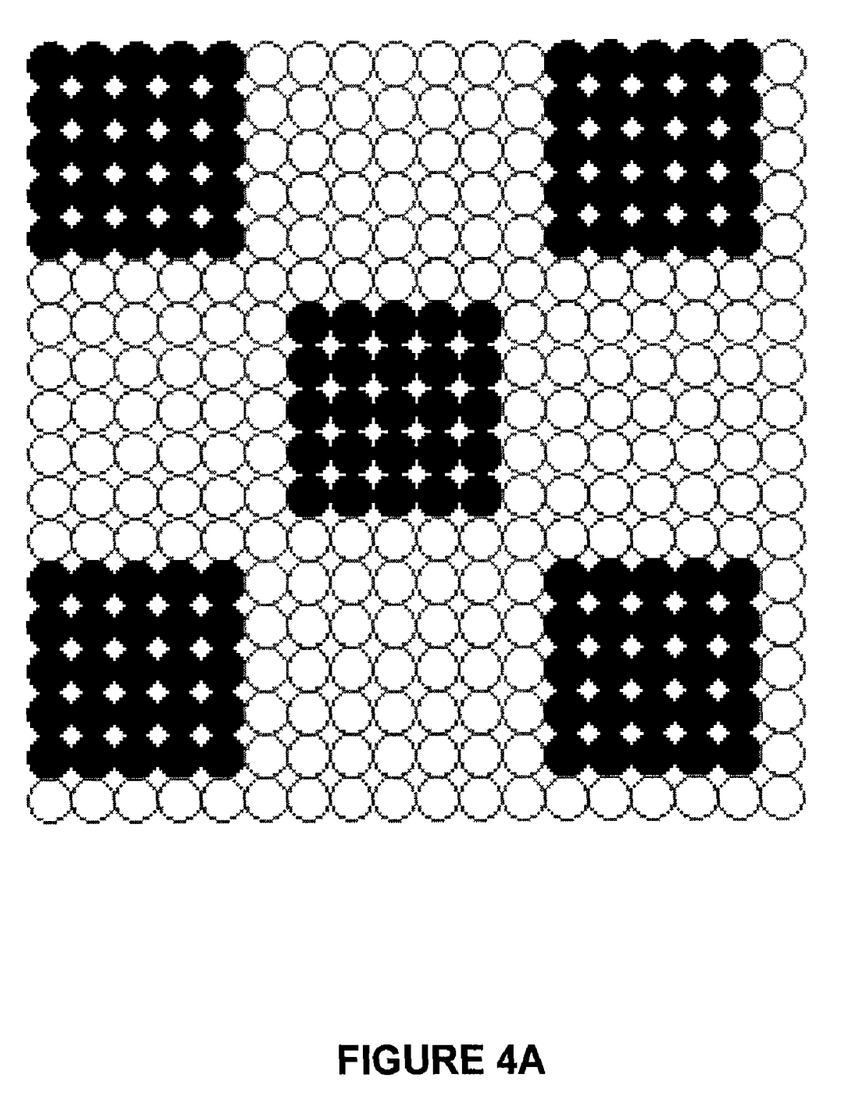
FIG. 4A shows a reduced-ink configuration in which an interior 5×5 dot set of the overall elemental 6×6 region is filled with ink.
Figure 4B:
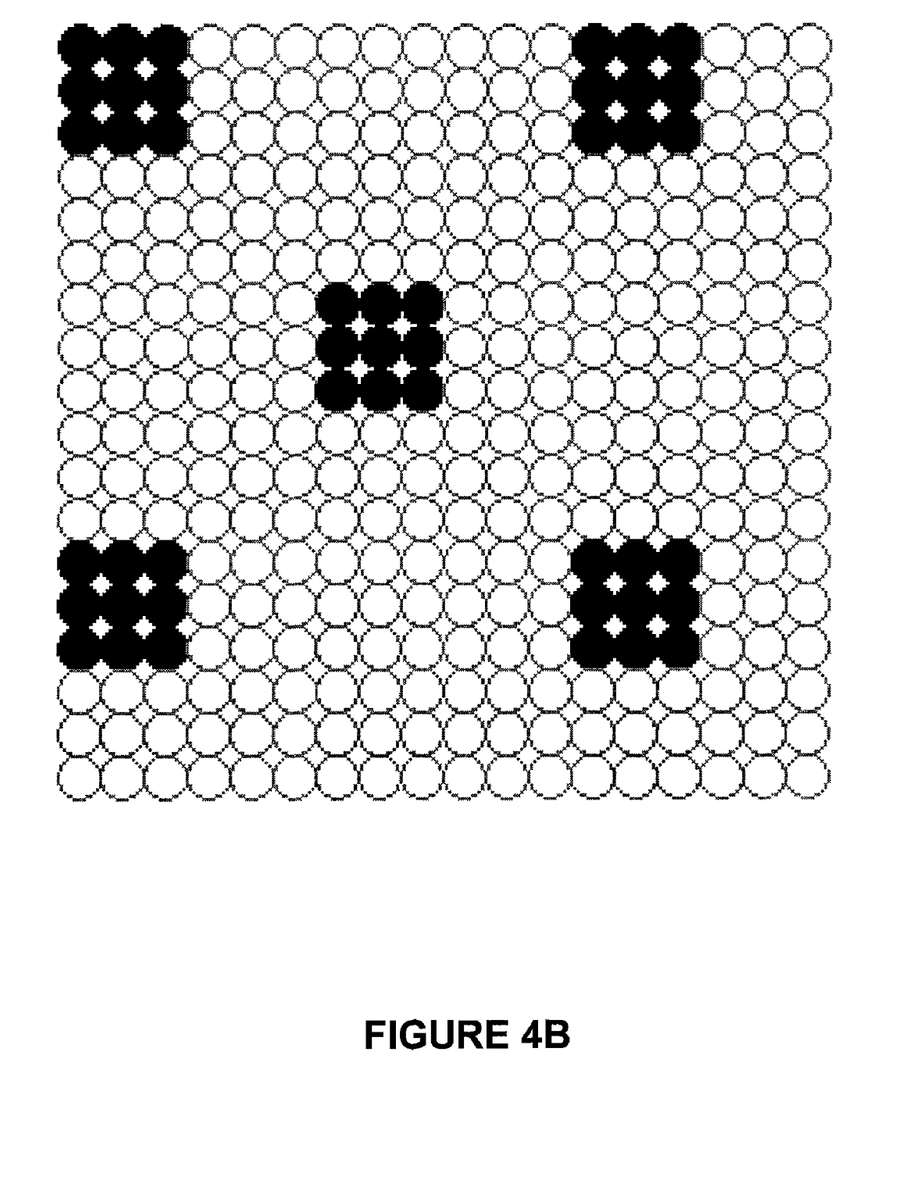
FIG. 4B shows a reduced-ink configuration in which an interior 3×3 dot set of the overall elemental 6×6 region is filled with ink.
Figure 4C:
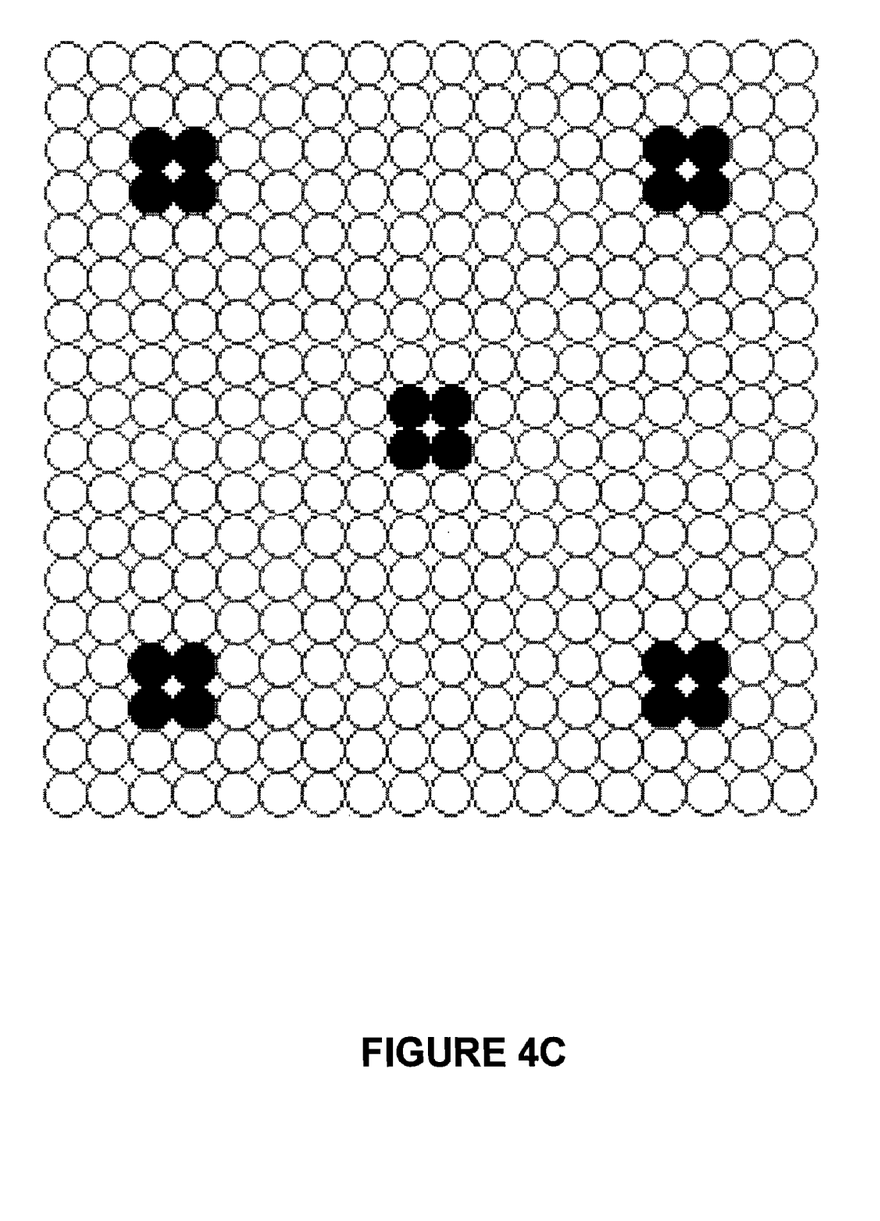
FIG. 4C shows a reduced-ink configuration in which an interior 2×2 dot set of the overall elemental 6×6 region is filled with ink.
Figure 4D:
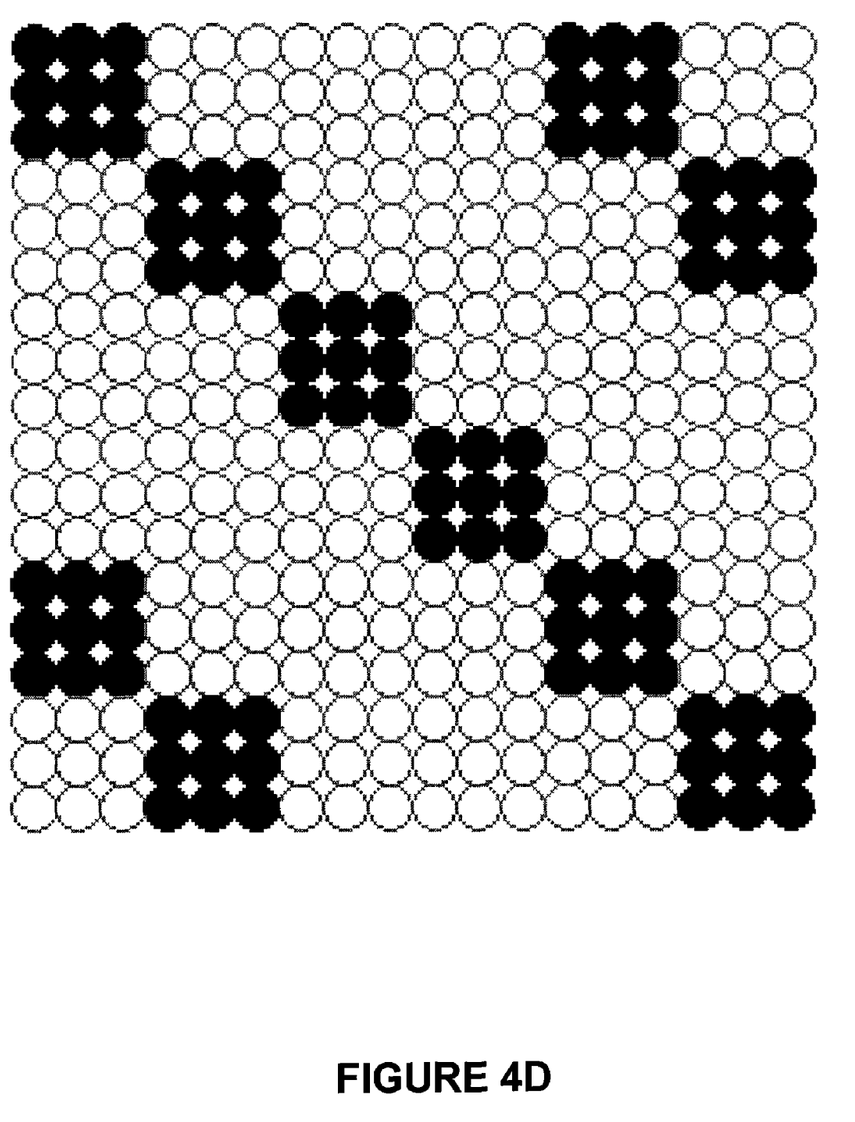
FIG. 4D shows a reduced-ink configuration in which two diagonally-related interior 3×3 dot sets within the overall elemental 6×6 region are filled with ink.

In the ink-jet printing process, each elemental region of a datamatrix barcode is typically composed of an array of ink-dot locations. For example, printing a 20-mil barcode on an ink-jet printer with 300-dot-per-inch resolution would cause each of the barcode's foreground elements to contain 6 ink dots by 6 ink dots. To further illustrate, FIG. 3 (PRIOR ART) shows an ideal close-up representation of nine region elements within a conventionally printed datamatrix barcode. In FIG. 3, each element is composed of 36 ink-dot locations in a 6×6 configuration. The five foreground (dark) elements have all 36 of their ink-dot locations filled.

BRIEF SUMMARY OF THE INVENTION

An object of the present invention is to provide a reduced-ink barcode that decreases ink splatter and increases readability of the barcode.

Another object of the present invention is to furnish a system that creates a reduced-ink barcode that decreases ink splatter and increases readability of the barcode.

A further object of the present invention is to supply a method that produces a reduced-ink barcode that decreases ink splatter and increases readability of the barcode.

Still another object of the present invention is to disclose a reduced-ink barcode that comprises printed dot foreground and non-printed background element regions assembled into a detectable pattern on a document, wherein each printed dot foreground element region is a matrix of printed dots that has less than a maximum printed dot density.

Disclosed is a reduced-ink barcode that comprises printed dot foreground and non-printed background element regions assembled into a detectable pattern on a document. The detectable pattern may be a square, rectangle, or other equivalent geometric shape. Each of the printed dot foreground element regions is a matrix of printed dots that has less than a maximum printed dot density. The number of printed dots is variable and may range to the upper print resolution/application limitations of the particular printer employed in the subject process. The matrix may be 12×12 dots or greater in either dimension. For example, and not by way of limitation, one embodiment of the maximum printed dot density comprises a 6×6 dot matrix and the less than maximum printed dot density is selected from a group consisting of: 5×5; 4×4; 3×3; 2×2; and 1×1 matrices and any combination of the foregoing matrices that create a less than maximum printed dot density foreground element region.

The subject invention includes a system for creating the reduced-ink barcode (comprised of printed dot foreground and non-printed background element regions assembled into a detectable pattern on a document) that comprises a printer, frequently an ink-jet printer, for applying the matrix of printed dots into the plurality of foreground element regions on the document and a controller that directs the printer to apply the less-than-maximum printed dot density in each of the foreground element regions.

Additionally, the subject invention includes a method of creating the reduced-ink barcode that comprises the steps of determining the less-than-maximum printed dot density for printing in each of the foreground element region and utilizing a printer for applying the less-than-maximum printed dot density regions to produce the barcode on the document.

Further objects and aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWINGS

The invention will be more fully understood by reference to the following drawings which are for illustrative purposes only.

DETAILED DESCRIPTION OF THE INVENTION

Figure 5:
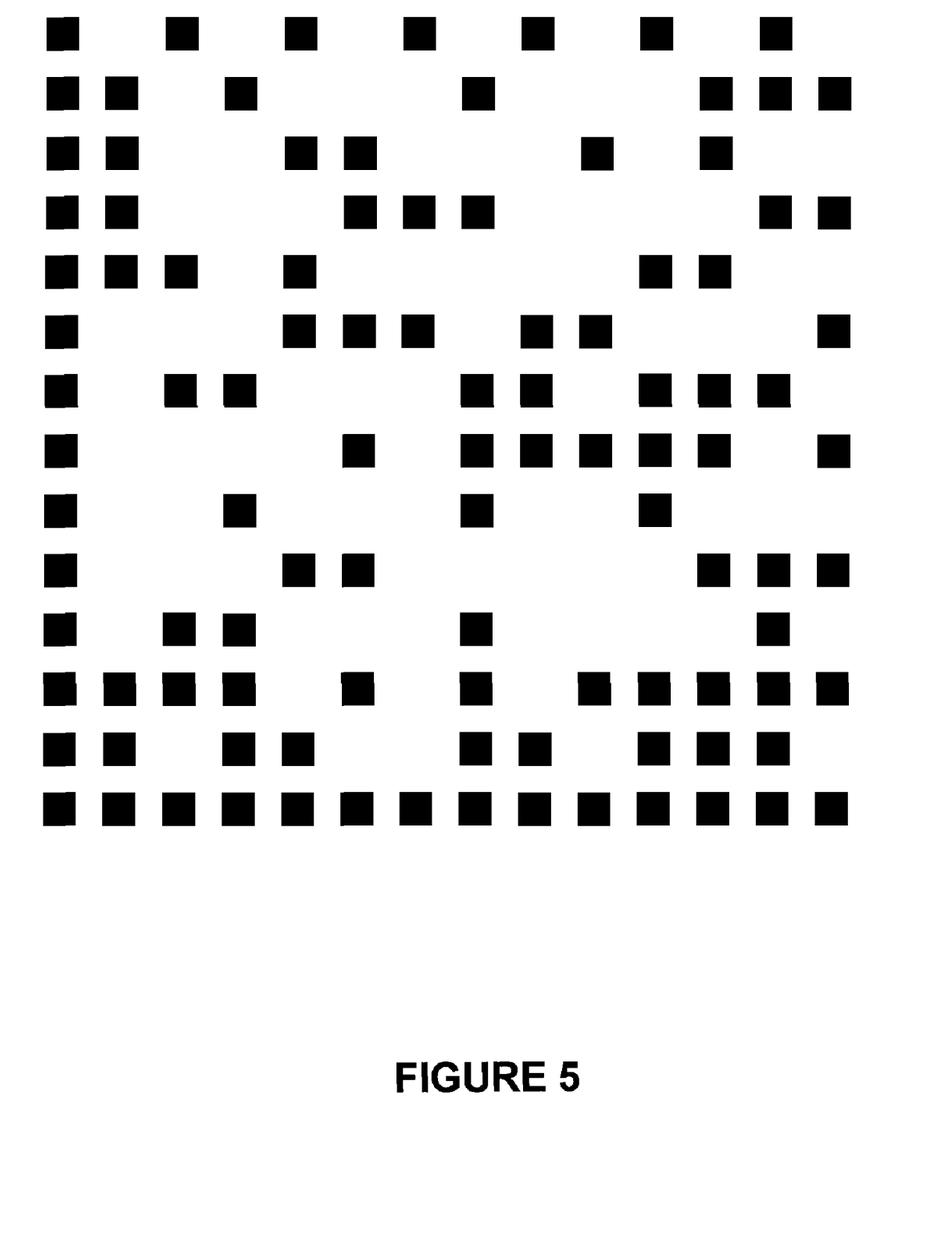
FIG. 5 shows the resultant reduced-ink barcode that is generated by application of the subject reduced-ink barcode printing technique to the traditional datamatrix barcode seen in FIG. 1.
Figure 6:
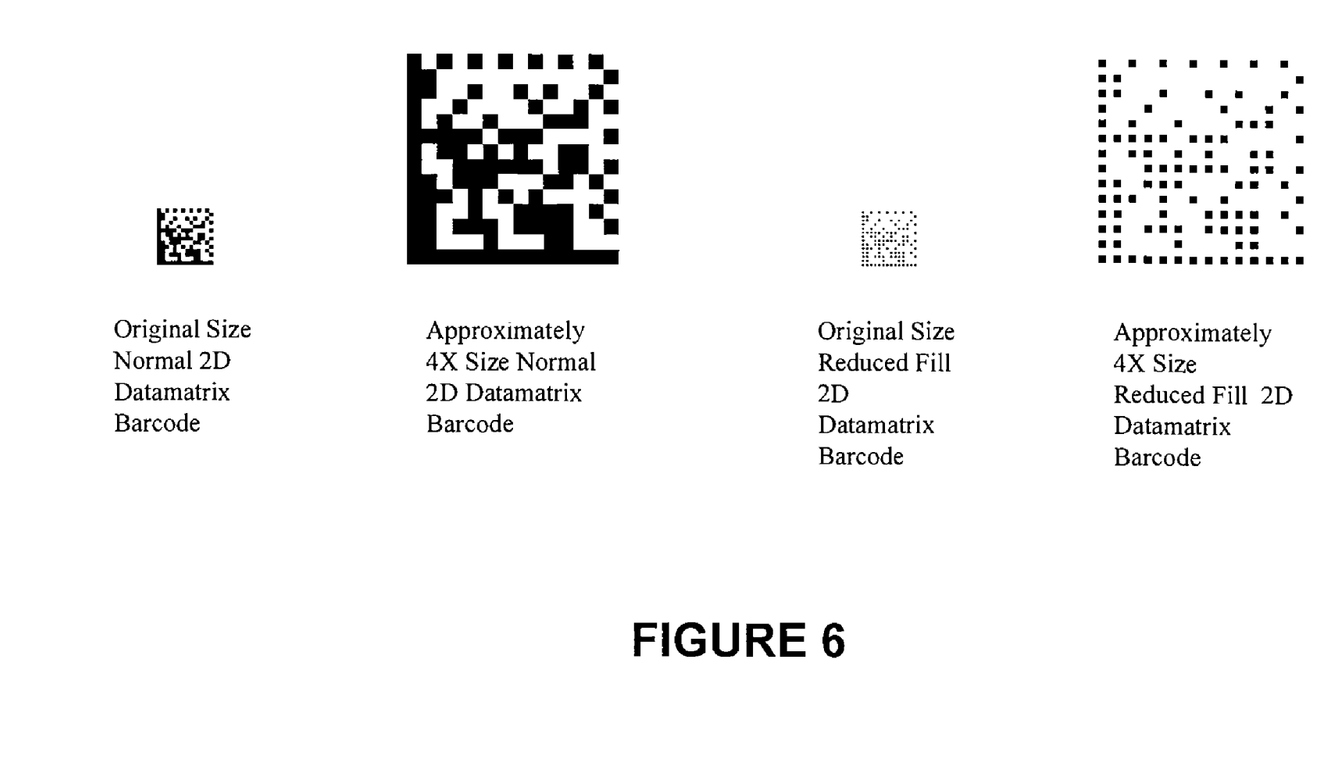
FIG. 6 shows a comparison between the appearance of a 2-D barcode printed with the traditional technique (on the left in an actual size and a 4× expanded view) and one printed with the subject reduced-ink technique (on the right in an actual size and a 4× expanded view).

Referring more specifically to the drawings, for illustrative purposes the present invention is embodied in the apparatus generally shown in FIGS. 4 through 6. It will be appreciated that the apparatus may vary as to configuration and as to details of the parts, and that the method may vary as to the specific steps and sequence, without departing from the basic concepts as disclosed herein.

Generally, the subject invention is a reduced-ink barcode that increased readability over existing barcodes and a technique for generating the reduced-ink barcode. FIGS. 4A, 4B, 4C, 4D, 5, and 6 (right-hand side) illustrate various embodiments of the subject invention.

An effective technique to counter the effects of the ink splatter, noted above, is to reduce the amount of ink within each barcode element region without changing the overall size of the element region, which preserves the original x-dimension of the barcode. For example, using this technique, foreground elements that are traditionally 6-dots by 6-dots (thus, having a dot density of 36 dots for the original barcode) may only have their upper-left dots filled with ink (thus, generating a significantly reduced dot density for the subject reduced-ink barcode).

FIGS. 4 (A, B, C, and D) illustrates several variations of reduced fill within the five foreground barcode elements. Other equivalent reduced-ink variations are possible (such as the single upper-left dot pattern noted above).

Using a subject reduced-fill technique, the complete barcode from FIG. 1 (PRIOR ART) now appears as a subject reduced-ink datamatrix barcode shown in FIG. 5.

FIG. 6 depicts, on the left, a traditional datamatrix barcode in both its normal document application size and, for clarity sake, a 4× expanded version. On the right of FIG. 6, a subject reduced-ink datamatrix barcode is printed in both its normal document application size and, for clarity sake, a 4× expanded version. Plainly, the reduced-ink version is lighter in appearance (less of a distraction to a viewer), yet provides enhanced readability over the traditional barcode. For the subject invention, "less" really is "more" in terms of a lower visual-impact barcode that has improved detection characteristics.

The reduced amount of ink within each foreground element is especially suited to ink-jet printer technology and helps to maintain a clear distinction between foreground and background elements. Because reduced-fill barcodes exercise an ink-jet printer's capability in the fine placement of dots, the readability of these barcodes strongly tracks overall document print quality and can serve as an indicator of general print quality. These advantages generally increase as barcodes shrink in size. Datamatrix barcode readers that were used to verify the improved readability of the subject barcodes and technique exhibit improved success at decoding reduced-fill barcodes when compared to traditional barcodes containing significant ink spatter. Other advantages include, but are not limited to: 1) improved aesthetics of a barcode because the barcode's significantly fainter appearance stands out less from surrounding graphics and printed content; 2) potential readability improvement of other barcode formats that suffer from ink splatter (in addition to datamatrix (2-D); and 3) less ink is used per barcode.

From the description herein, it will be appreciated that the present invention can be embodied in various ways, which include but are not limited to the following.

1. A reduced-ink barcode that comprises printed dot foreground and non-printed background element regions assembled into a detectable pattern on a document, wherein each said printed dot foreground element region is a matrix of printed dots that has less than a maximum printed dot density.

2. A reduced-ink barcode according to embodiment 1, wherein said maximum printed dot density comprises a 6×6 dot matrix and said less than maximum printed dot density is selected from a group consisting of: 5×5; 4×4; 3×3; 2×2; and 1×1 matrices and any combination of the foregoing matrices that creates a less than maximum printed dot density foreground element region.

3. An improved barcode comprised of printed dot foreground and non-printed background element regions assembled into a detectable pattern on a document, wherein said improvement comprises each said printed dot foreground element region comprises a matrix of printed dots having less than a maximum printed dot density.

4. An improved barcode according to Embodiment 3, wherein said maximum printed dot density comprises a 6×6 dot matrix and said less than maximum printed dot density is selected from a group consisting of: 5×5; 4×4; 3×3; 2×2; and 1×1 matrices and any combination of the foregoing matrices that creates a less than maximum printed dot density foreground element region.

5. A system for creating a reduced-ink barcode comprised of printed dot foreground and non-printed background element regions assembled into a detectable pattern on a document, comprising:

a) a printer for applying a matrix of printed dots into a plurality of foreground element regions on the document and b) a controller that directs said printer to apply a less-than-maximum printed dot density in each said foreground element region.

6. A system according to Embodiment 5, wherein said maximum printed dot density comprises a 6×6 dot matrix and said less than maximum printed dot density is selected from a group consisting of: 5×5; 4×4; 3×3; 2×2; and 1×1 matrices and any combination of the foregoing matrices that creates a less than maximum printed dot density foreground element region.

7. A system according to embodiment 6, wherein said printer is an ink-jet printer.

8. A method of creating a reduced-ink barcode comprised of printed dot foreground and non-printed background element regions assembled into a detectable pattern on a document, comprising the steps:
   a) determining a less-than-maximum printed dot density for printing in each said foreground element region and
   b) utilizing a printer for applying said less-than-maximum printed dot density regions to produce the barcode on the document.

9. A method according to embodiment 8, wherein said maximum printed dot density comprises a 6×6 dot matrix and said less than maximum printed dot density is selected from a group consisting of: 5×5; 4×4; 3×3; 2×2; and 1×1 matrices and any combination of the foregoing matrices that creates a less than maximum printed dot density foreground element region.

10. A method according to embodiment 8, wherein said printer is an ink-jet printer.

Although the description herein contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device, product, system, or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A reduced-ink barcode utilized to counter barcode readability-degrading ink splatter, wherein said reduced-ink barcode comprises printed dot foreground and non-printed background element regions assembled into a detectable pattern on a document, wherein each said printed dot foreground element region is a matrix of printed dots that has less than a maximum printed dot density, wherein said less than maximum dot matrix decreases ink splatter thereby increasing readability of the reduced-ink barcode as compared with a standard barcode, wherein said maximum printed dot density comprises a 6×6 dot matrix and said less than maximum printed dot density is selected from a group consisting of: 5×5; 4×4; 3×3; 2×2; and 1×1 matrices and any combination of the foregoing matrices that creates a less than maximum printed dot density foreground element region.

2. An improved barcode utilized to counter barcode readability-degrading ink splatter, wherein said reduced-ink barcode is comprised of printed dot foreground and non-printed background element regions assembled into a detectable pattern on a document, wherein said improvement comprises each said printed dot foreground element region comprises a matrix of printed dots having less than a maximum printed dot density, wherein said maximum printed dot density comprises a 6×6 dot matrix and said less than maximum printed dot density is selected from a group consisting of: 5×5; 4×4; 3×3; 2×2; and 1×1 matrices and any combination of the foregoing matrices that creates a less than maximum printed dot density foreground element region.

3. A system for creating a reduced-ink barcode utilized to counter barcode readability-degrading ink splatter, wherein said reduced-ink barcode is comprised of printed dot foreground and non-printed background element regions assembled into a detectable pattern on a document, comprising:
   a) a printer for applying a matrix of printed dots into a plurality of foreground element regions on the document and
   b) a controller that directs said printer to apply a less-than-maximum printed dot density in each said foreground element region, wherein said less than maximum dot matrix decreases ink splatter thereby increasing readability of the reduced-ink barcode as compared with a standard barcode, wherein said maximum printed dot density comprises a 6×6 dot matrix and said less than maximum printed dot density is selected from a group consisting of: 5×5; 4×4; 3×3; 2×2; and 1×1 matrices and any combination of the foregoing matrices that creates a less than maximum printed dot density foreground element region.

4. A system according to claim 3, wherein said printer is an ink-jet printer.

5. A method of creating a reduced-ink barcode utilized to counter barcode readability-degrading ink splatter, wherein said reduced-ink barcode is comprised of printed dot foreground and non-printed background element regions assembled into a detectable pattern on a document, comprising the steps:
   a) determining a less-than-maximum printed dot density for printing in each said foreground element region and
   b) utilizing a printer for applying said less-than-maximum printed dot density regions to produce the barcode on the document, wherein said less than maximum printed dot density decreases ink splatter thereby increasing readability of the reduced-ink barcode as compared with a standard barcode, wherein said maximum printed dot density comprises a 6×6 dot matrix and said less than maximum printed dot density is selected from a group consisting of: 5×5; 4×4; 3×3; 2×2; and 1×1 matrices and any combination of the foregoing matrices that creates a less than maximum printed dot density foreground element region.

* * * * *